United States Patent
Higashino et al.

(10) Patent No.: US 12,043,739 B2
(45) Date of Patent: Jul. 23, 2024

(54) CURABLE WATER-SWELLING WATERSTOP MATERIAL, WATERSTOP STEEL SHEET PILE, WATERSTOP STEEL SHEET PILE PRODUCTION METHOD, AND WATER-STOPPING METHOD

(71) Applicant: NIPPON CHEMICAL PAINT CO., LTD., Kanagawa (JP)

(72) Inventors: Takaaki Higashino, Kanagawa (JP); Kenji Kato, Kanagawa (JP)

(73) Assignee: NIPPON CHEMICAL PAINT CO., LTD., Kanagawa (JP)

( * ) Notice: Subject to any disclaimer, the term of this patent is extended or adjusted under 35 U.S.C. 154(b) by 362 days.

(21) Appl. No.: 17/422,597

(22) PCT Filed: Jan. 14, 2020

(86) PCT No.: PCT/JP2020/000923
§ 371 (c)(1),
(2) Date: Jul. 13, 2021

(87) PCT Pub. No.: WO2020/149269
PCT Pub. Date: Jul. 23, 2020

(65) Prior Publication Data
US 2022/0089874 A1    Mar. 24, 2022

(30) Foreign Application Priority Data
Jan. 18, 2019   (JP) ................................ 2019-007316

(51) Int. Cl.
| | |
|---|---|
| C08L 83/06 | (2006.01) |
| C08K 3/34 | (2006.01) |
| C08K 5/544 | (2006.01) |
| C08L 71/02 | (2006.01) |
| C09K 3/10 | (2006.01) |
| E02D 5/08 | (2006.01) |
| C08L 1/28 | (2006.01) |

(52) U.S. Cl.
CPC .............. *C08L 83/06* (2013.01); *C08K 3/34* (2013.01); *C08K 5/544* (2013.01); *C08L 71/02* (2013.01); *C09K 3/1018* (2013.01); *E02D 5/08* (2013.01); *C08L 1/286* (2013.01); *C09K 2003/104* (2013.01)

(58) Field of Classification Search
CPC .......... C08L 83/06; C08L 1/286; C08L 71/02; C08K 3/34; C08K 5/544; E02D 5/08
See application file for complete search history.

(56) References Cited

U.S. PATENT DOCUMENTS

| | | | | |
|---|---|---|---|---|
| 4,725,648 A | * | 2/1988 | Fujimoto | ................ C08L 83/04 528/31 |
| 4,788,240 A | * | 11/1988 | Fujimoto | ............. C08K 5/0041 524/588 |
| 5,075,373 A | * | 12/1991 | Takemori | ................ C08L 21/00 525/58 |
| 5,371,164 A | * | 12/1994 | Kobayashi | .............. F28F 9/013 528/901 |
| 6,020,446 A | * | 2/2000 | Okamoto | ............. C09K 3/1018 526/279 |
| 2002/0037384 A1 | * | 3/2002 | Matsunaga | .......... C09D 133/02 428/36.91 |
| 2012/0107626 A1 | * | 5/2012 | Schindler | ............. C08G 65/336 524/588 |

FOREIGN PATENT DOCUMENTS

| | | | | | |
|---|---|---|---|---|---|
| CN | 104789149 A | * | 7/2015 | ............... | C09J 7/02 |
| JP | H0264160 A | * | 3/1988 | ............... | C08K 5/54 |
| JP | H01-168766 A | | 7/1989 | | |
| JP | H04164963 A | * | 6/1992 | ............... | C08K 3/28 |
| JP | 2003-292939 A | | 10/2003 | | |
| JP | 2005-113464 A | | 4/2005 | | |
| JP | 5447655 B2 | | 3/2014 | | |
| JP | 2014-084345 A | | 5/2014 | | |
| WO | WO-2010/008079 A1 | | 1/2010 | | |
| WO | WO-2010/047249 A1 | | 4/2010 | | |
| WO | WO-2011/114849 A1 | | 9/2011 | | |
| WO | WO-2014/132736 A1 | | 9/2014 | | |

OTHER PUBLICATIONS

International Search Report issued in PCT Pat. Appl. No. PCT/JP2020/000923 mailed Feb. 25, 2020.
"Extender Pigments," Surface Coatings, vol. 1—Raw Materials and Their Usage, Oil and Colour Chemists' Association, Australia, 1983, pp. 344-351 (abstract only).

* cited by examiner

*Primary Examiner* — Jane L Stanley
(74) *Attorney, Agent, or Firm* — MARSHALL, GERSTEIN & BORUN LLP (57) ABSTRACT

A curable water-swelling water stop material including: 100 parts by mass of a resin component which includes 40 to 100 parts by mass of a curable resin having a hydrolysable alkoxysilyl group and 0 to 60 parts by mass of a polyether polyol; 0.3 to 25 parts by mass of an aminosilane coupling agent; 20 to 250 parts by mass of a water-absorbent resin; and 0 to 160 parts by mass of an extender pigment, in which the hydrolysable alkoxysilyl group having a structure represented by Formula (1) —X—$CH_2$—$SiR^1{}_Y(OR^2)_{3-Y}$, in which X is a bonding functional group having a heteroatom with an unshared electron pair and bonding to a methylene group bonding to a silicon atom of a hydrolysable silicon group, $R^1$ and $R^2$ are $C_1$-$C_3$ alkyl groups respectively, and Y is 0, 1 or 2.

16 Claims, 4 Drawing Sheets

CURABLE WATER-SWELLING WATERSTOP MATERIAL, WATERSTOP STEEL SHEET PILE, WATERSTOP STEEL SHEET PILE PRODUCTION METHOD, AND WATER-STOPPING METHOD

TECHNICAL FIELD

The present invention relates to a curable water-swelling water stop material, a water stop steel sheet pile, a water stop steel sheet pile production method, and a water-stopping method.

BACKGROUND ART

Steel sheet piles are used in waste treatment plants, revetment work, sea and river cofferdam work, work for new construction, removal, or the like of piers and abutments, utility tunnel installation work, excavation work preceding building construction and water and sewage pipe laying work, and the like. Steel sheet piles include U-shaped steel sheet piles, Z-shaped steel sheet piles, hat-shaped steel sheet piles, and linear steel sheet piles, and each type of them is provided with joint portions (tab portions) at both ends that enable engagement with other steel sheet piles. In addition, some steel sheet piles are provided with curable water-swelling water stop material in the form of a coating film at the joint portions. Such steel sheet piles are called water stop steel sheet piles and the like. After at least parts of the water stop steel sheet piles are driven or pressed into the ground (hereinafter sometimes simply referred to as "installation, driving into, or the like"), the curable water-swelling water stop material provided on the water stop steel sheet piles absorbs groundwater or seawater or river water and swells (expands) to fill the clearances between the joint portions and stop the water.

Many inventions relating to the above-mentioned curable water-swelling water stop material have been proposed.

For example, Patent Literature 1 describes a polyurethane resin-forming composition which contains prepolymer having an aromatic isocyanate group at the end of the polymer chain and an aliphatic organic polyisocyanate being one or more compounds selected from a specific group, and which contains an organic polyisocyanate composition for a water stop material in which the ratio of the content and number of isocyanate groups is within a predetermined range, and an amine-based polyol in which the nominal average number of functional groups is 3 to 6, such that the isocyanate group/hydroxyl group ratio is within a predetermined range. Further, this polyurethane resin-forming composition is such that the prepolymer having an aromatic isocyanate group at the end of the polymer chain is a reaction product of an aromatic polyisocyanate and a polyether polyol, and the polyether polyol includes a polyether polyol having a specific range of oxyethylene group content and a nominal average number of functional groups of 2, and a polyether polyol having a specific range of oxyethylene group content and a nominal average number of functional groups of 3.

Further, for example, Patent Literature 2 describes a water-swelling coating composition composed of an ionizing water-absorbing polymer, a polyvalent metal compound, and an organic solvent solution of an elastomer.

CITATION LIST

Patent Literature

Patent Literature 1: Japanese Patent No. 5447655
Patent Literature 2: Japanese Patent Application Publication No. H 1-168766

SUMMARY OF INVENTION

Technical Problem

However, for the inventions described in Patent Literatures 1 and 2, there have been demands for higher adhesiveness with metal in order to prevent the curable water stop material from peeling off due to friction between steel sheet piles during an installation. In addition, if the swelling ratio of the water stop material is low or the strength of the swollen water stop material is low, it may not be able to withstand the water pressure and water may leak. Further, it cannot be said that the invention described in Patent Literature 2 is preferable for workers and the environment because it contains a volatile organic solvent in its composition. Moreover, not limited to the inventions described in Patent Literatures 1 and 2, the curable water-swelling water stop material is required to absorb water to swell and maintain a certain level of strength (swelling material strength) in order to obtain a sufficient ability to stop water.

The present invention has been made in view of the above circumstances, and an object thereof is to provide a curable water-swelling water stop material which is favorable to workers and the environment, excellent in adhesiveness to metals, and sufficient in a swelling ratio and a swelling material strength, a water stop steel sheet pile, a method of producing a water stop steel sheet pile, and a water-stopping method.

Solution to Problem

A curable water-swelling water stop material according to the present invention that has solved the above problems contains, based on 100 parts by mass of a resin component composed of 40 to 100 parts by mass of a curable resin (A) having a hydrolyzable alkoxysilyl group represented by the formula (1) and 0 to 60 parts by mass of a polyether polyol (B), 0.3 to 25 parts by mass of an aminosilane coupling agent (C), 20 to 250 parts by mass of a water-absorbent resin (D), and 0 to 160 parts by mass of an extender pigment (E).

$$—X—CH_2—SiR^1{}_Y(OR^2)_{3-Y} \quad \text{Formula (1)}$$

Note that, in the above formula (1), X represents a bonding functional group in which a hetero atom having an unshared electron pair is bonded to a methylene group bonded to a silicon atom contained in a hydrolyzable silicon group, $R^1$ and $R^2$ each represent $C_1$-$C_3$ alkyl group, and Y represents 0, 1, or 2.

In a water stop steel sheet pile according to the present invention, a coating film made of the curable water-swelling water stop material is provided on a joint portion of the steel sheet pile.

A method of producing a water stop steel sheet pile according to the present invention includes a coating step of coating a joint portion of the steel sheet pile with the curable water-swelling water stop material, and a coating film forming step of curing the curable water-swelling water stop material to form a coating film.

In addition, a water-stopping method according to the present invention includes a driving/pressing-in step of driving or pressing at least part of a water stop steel sheet pile into the ground while a joint portion of the water stop steel sheet pile is continuously being coated with the curable water-swelling water stop material, and a curing step of curing the curable water-swelling water stop material to stop water.

Advantageous Effects of Invention

A curable water-swelling water stop material, a water stop steel sheet pile, a method of producing a water stop steel sheet pile, and a water-stopping method according to the present invention are favorable to workers and the environment, excellent in adhesiveness to metals, and sufficient in a swelling ratio and a swelling material strength.

DESCRIPTION OF EMBODIMENTS

Hereinafter, embodiments of a curable water-swelling water stop material, a water stop steel sheet pile, a method of producing a water stop steel sheet pile, and a water-stopping method according to the present invention will be described in detail with reference to the drawings as appropriate.

In addition, "a numerical value to a numerical value" stated in the present specification is used in the meaning of having the numerical values described before and after "to" as a lower limit value and an upper limit value. In the numerical ranges described stepwise in the present specification, the upper limit value or the lower limit value described in one numerical range may be replaced with the upper limit value or the lower limit value described in another stepwise. The upper limit values or lower limit values of the numerical ranges described in the present specification may be replaced with the values shown in the Examples.

Curable Water-Swelling Water Stop Material

A curable water-swelling water stop material according to the present embodiment is a composition which contains, based on 100 parts by mass of a resin component composed of 40 to 100 parts by mass of a curable resin (A) having a hydrolyzable alkoxysilyl group represented by the formula (1) and 0 to 60 parts by mass of a polyether polyol (B), 0.3 to 25 parts by mass of an aminosilane coupling agent (C), 20 to 250 parts by mass of a water-absorbent resin (D), and 0 to 160 parts by mass of an extender pigment (E).

$$—X—CH_2—SiR^1{}_Y(OR^2)_{3-Y} \qquad \text{Formula (1)}$$

Note that, in the above formula (1), X represents a bonding functional group in which a hetero atom having an unshared electron pair is bonded to a methylene group bonded to a silicon atom contained in a hydrolyzable silicon group ($SiR^1Y$). In addition, $R^1$ and $R^2$ each represent an alkyl group having 1 to 3 carbon atoms. Y represents 0, 1, or 2.

In the curable resin (A), the hydrolyzable alkoxysilyl groups of molecular ends, which are represented by the above formula (1), react with water and polycondensations proceed to form a polymer. That is, condensation reactions proceed without a volatile organic solvent in the composition of the curable water-swelling water stop material. Further, by condensation reactions of the hydrolyzable alkoxysilyl group of the curable resin (A), the curable water-swelling water stop material is cured and adheres to the metal. Therefore, the curable resin (A) preferably has hydrolyzable alkoxysilyl groups represented by the formula (1) at both ends of the linear backbone chain. Note that the curable resin (A) may contain a hydrolyzable alkoxysilyl group represented by the formula (1) in the side chain.

The above-mentioned bonding functional group is a functional group having a structure connecting a hydrolyzable silicon group and a backbone. For example, such a bonding functional group is preferably a functional group having at least one of a (thio)urethane bond, a (thio)urea bond, a (thio)substituted urea bond, a (thio)ester bond, a (thio)ether bond, and the like. Note that the bonding functional group is not limited to those described above, as long as a hetero atom having an unshared electron pair is bonded to a methylene group bonded to a silicon atom contained in a hydrolyzable silicon group. The hetero atom refers to an atom other than carbon and hydrogen, and in the present embodiment, it is possible to use, for example, N, O, F, Si, P, S, Cl, Br, I, and the like.

Further, as represented by the above formula (1), 1 to 3 alkoxy groups ($OR^2$) bonds to the silicon atom as hydrolyzable groups other than the silicon-methylene group bond, and 2 to 0 alkyl groups ($R^1$) also bond to the silicon atom as a remaining partner.

Here, $R^1$ and $R^2$ are each an alkyl group having 1 to 3 carbon atoms. Therefore, examples of the alkoxy groups ($OR^2$) include a methoxy group, an ethoxy group, and a propoxy group, and a methoxy group or an ethoxy group is preferable. Examples of the alkyl groups ($R^1$) bonding to the silicon atom as a remaining partner include a methyl group and an ethyl group, and a methyl group is preferable.

Further, the hydrolyzable silicon group is preferably an alkyldialkoxysilyl group (Y is 1) or a trialkoxysilyl group (Y is 0), from the viewpoint of availability, adhesiveness to metal, strength after absorbing water and swelling, that is, maintaining the swelling material strength, and the like.

As described above, the amount of the curable resin (A) added may be arbitrarily adjusted in the range of 40 to 100 parts by mass when the resin component composed of the curable resin (A) and the polyether polyol (B) described later is set to 100 parts by mass. As the content of the curable resin (A) increases within this range, the adhesiveness to the metal is increased. Further, as the content of the curable resin (A) increases within this range, the viscosity of the curable water-swelling water stop material becomes higher and the curing time becomes shorter. The amount of the curable resin (A) added may be 50 to 90 parts by mass, or may be 60 to 80 parts by mass, in consideration of the adhesiveness to metal, the viscosity, and the curing time when the resin component composed of the curable resin (A) and the polyether polyol (B) described later is set to 100 parts by mass.

The molecular weight of the curable resin (A) is not particularly limited, but for example, it is preferably 1000 to 80000, more preferably 1500 to 60000, and further preferably 2000 to 40000. The molecular weight of the curable resin (A) is preferably 1000 to 80000 because the resin has an appropriate cross-linking density and thus maintains the adhesiveness to metal and the swelling material strength. Workability is also good because an appropriate viscosity is obtained.

When the curable resin (A) has the above-mentioned chemical structure, a moisture reactivity which is extremely higher than that of a normal hydrolyzable silicon group is obtained. Therefore, a sufficient curing speed is achieved without using an organic tin compound that serves as a silanol condensation catalyst, for example, a catalyst such as dibutyltin dilaurate, or even using much smaller use amount than usual.

Examples of the backbone of the curable resin (A) include, but are not limited to, at least one selected from backbone commonly used in silicone resins and modified silicone resins such as polyoxyalkylenes, vinyl polymers, saturated hydrocarbon polymers, unsaturated hydrocarbon polymers, polyesters, polycarbonates, and polydimethylsiloxanes. Among these, the preferable backbone of the curable resin (A) is polyoxyalkylene from the viewpoint of availability and maintaining the swelling material strength. Note that the polyoxyalkylene is preferably the main element of the repeating unit whose structure is the backbone of the curable resin (A). The structure of the polyoxyalkylene may be contained alone in the curable resin (A), or two or more kinds of the polyoxyalkylene may be contained.

The curable resin (A) may be produced by a conventionally known method. Examples of conventionally known methods include a method of reacting a polyol compound with an isocyanate methyl alkoxysilane compound. In addition, for example, a conventionally known method is a method of reacting a polyol compound with a polyisocyanate compound to synthesize a urethane prepolymer, and then reacting the urethane prepolymer with a compound in which a hetero atom with an active hydrogen group bonds at the α-position, such as an aminomethyl alkoxysilane compound.

Examples of the curable resin (A) that is preferably used include GENIOSIL (registered trademark) STP-E10, GENIOSIL STP-E30, GENIOSIL STP-E15, GENIOSIL STP-E35, and the like manufactured by Wacker Chemie AG.

The polyether polyol (B) is added as a plasticizer (diluent) for adjusting the viscosity, curing time or the like of the curable water-swelling water stop material. Adding the polyether polyol (B) improves the mechanical properties of the coating film of the curable water-swelling water stop material, such as flexibility and elastic recovery. Therefore, the coating film is less likely to peel off when water stop steel sheet piles are installed by driving or the like, and ability to stop the water is also less likely to decrease.

The polyether polyol (B) may be arbitrarily added depending on the desired physical properties of the curable water-swelling water stop material, and may be 0 parts by mass. That is, as described above, the amount of the polyether polyol (B) added may be adjusted in the range of 0 to 60 parts by mass when the resin component composed of the curable resin (A) and the polyether polyol (B) is set to 100 parts by mass. As the content of the polyether polyol (B) increases within this range, the viscosity of the curable water-swelling water stop material decreases, and the curing time also increases. Depending on the desired physical properties of the curable water-swelling water stop material, the amount of the polyether polyol (B) added may be 0 to 50 parts by mass, 0 to 40 parts by mass, and 0 to 30 parts by mass when the resin component composed of the curable resin (A) and the polyether polyol (B) is set to 100 parts by mass. Note that the amount of the polyether polyol (B) added may be 10 parts by mass or more and 20 parts by mass or more when the resin component composed of the curable resin (A) and the polyether polyol (B) is set to 100 parts by mass.

However, when the amount of the polyether polyol (B) added exceeds 60 parts by mass when the resin component composed of the curable resin (A) and the polyether polyol (B) is set to 100 parts by mass (that is, when the amount of the curable resin (A) added is less than 40 parts by mass when the resin component composed of the curable resin (A) and the polyether polyol (B) is set to 100 parts by mass), the hydrolyzable alkoxysilyl group represented by the formula (1) of the curable resin (A) is relatively small, and thus the adhesiveness to metal is decreased. Further, in this case, the condensation reaction by the hydrolyzable alkoxysilyl group represented by the formula (1) of the curable resin (A) may not be carried out at a sufficient cross-linking density, and thus the water-absorbent resin (D) may not be sufficiently retained and is washed away, for example. As a result, even when water is absorbed, the material may not swell sufficiently. Therefore, a sufficient ability to stop water may not be obtained.

The polyether polyol (B) may be produced by a conventionally known method. For example, the polyether polyol (B) may be produced by additionally polymerizing a low molecular weight compound having two or more hydroxyl groups in a molecule such as glycol, glycerin, sorbitol, and sucrose, with an alkylene oxide such as propylene oxide or ethylene oxide. Examples of the preferable polyether polyol (B) to be used include one having 2 to 8 functional groups and an average molecular weight of 200 to 10000.

Examples of the preferable polyether polyol (B) to be used include UNIOL (registered trademark) D-700 and UNIOL TG-1000R manufactured by NOF CORPORATION.

The aminosilane coupling agent (C) is a compound which includes a silicon atom bonding to an alkoxy group and a functional group with a nitrogen atom, in one molecule. By including the aminosilane coupling agent (C) in the curable water-swelling water stop material, the adhesiveness to metal is improved.

The amino group in the aminosilane coupling agent (C) may be any of primary, secondary, and tertiary amino groups, but a primary or secondary amino group, which are more likely to exhibit the effect of imparting adhesiveness to metal, is preferable, and a primary amino group is more preferable. Further, the number of amino groups in the aminosilane coupling agent (C) may be one or two or more. In addition, the hydrolyzable silicon group in the aminosilane coupling agent (C) is preferably, for example, an alkyldialkoxysilyl group or a trialkoxysilyl group from the viewpoint of availability, the adhesiveness to metal, maintaining the swelling material strength, and the like. The number of hydrolyzable silicon groups in the aminosilane coupling agent (C) may be one or two or more.

Examples of the usable aminosilane coupling agent (C) include 3-aminopropyltrimethoxysilane, 3-aminopropylmethyldimethoxysilane, 3-aminopropyltriethoxysilane, N-(2-aminoethyl)-3-aminopropyltrimethoxysilane, N-(2-aminoethyl)-3-aminopropyltriethoxysilane, N,N'-bis-[3-(trimethoxysilyl)propyl]ethylenediamine, N,N'-bis-[3-(triethoxysilyl)propyl]ethylenediamine, N,N'-bis-[3-(methyldimethoxysilyl)propyl]ethylenediamine, N,N'-bis-[3-(trimethoxysilyl)propyl]hexamethylenediamine, N,N'-bis-[3-(triethoxysilyl)propyl]hexamethylenediamine, and the like. As the aminosilane coupling agent (C), these compounds may be used alone or in combination of two or more kinds.

As described above, the content of the aminosilane coupling agent (C) may be adjusted in the range of 0.3 to 25 parts by mass when the resin component composed of the curable resin (A) and the polyether polyol (B) is set to 100 parts by mass. As the content of the aminosilane coupling agent (C) increases within this range, the adhesiveness to metal is improved.

The content of the aminosilane coupling agent (C) may be arbitrarily adjusted within the above range in consideration of the adhesiveness to metal and other physical properties such as curing time, storage stability, and handleability during work. From these points, the content of the aminosilane coupling agent (C) may be 1.5 to 20 parts by mass, 2 to 15 parts by mass, and 4 to 8 parts by mass when the resin component composed of the curable resin (A) and the polyether polyol (B) is set to 100 parts by mass.

However, if the content of the aminosilane coupling agent (C) is less than 0.3 parts by mass when the resin component composed of the curable resin (A) and the polyether polyol (B) is set to 100 parts by mass, the amount of the aminosilane coupling agent (C) is too small, and the adhesiveness to metal is decreased.

On the other hand, if the content of the aminosilane coupling agent (C) exceeds 25 parts by mass when the resin component composed of the curable resin (A) and the polyether polyol (B) is set to 100 parts by mass, the cross-linking density becomes too high, and as a result, even when water is absorbed, the material does not swell sufficiently. Therefore, a sufficient ability to stop water may not be obtained. Further, if the content of the aminosilane coupling agent (C) is too large, the curing time becomes extremely short, so that the storage stability, the handleability during work, and the like are decreased.

Examples of the aminosilane coupling agent (C) that can be preferably used include, but are not limited to, GENIOSIL GF96 manufactured by Wacker Chemie AG.

The water-absorbent resin (D) absorbs and retains water and increases the volume of the curable water-swelling waters top material.

The water-absorbent resin (D), for example, at least one selected from polyethylene oxide-based resins, carboxymethyl cellulose alkali metal salts, and polyacrylic acid alkali metal salts. The polyethylene oxide-based resins may be a resin composed only of ethylene oxide, or may be an ethylene oxide.propylene oxide random copolymer obtained by randomly copolymerizing ethylene oxide with other oxide compound (such as propylene oxide). Examples of the usable carboxymethyl cellulose alkali metal salts include sodium carboxymethyl cellulose salt, lithium carboxymethyl cellulose salt, potassium carboxymethyl cellulose salt, and the like. Examples of the usable polyacrylic acid alkali metal salts include sodium polyacrylate salt, lithium polyacrylate salt, potassium polyacrylate salt, and the like.

In addition, the water-absorbent resin (D) to be used are, for example, a hydrolysate of a starch-acrylic acid graft polymer, a saponified product of a vinyl acetate-acrylic acid ester copolymer, a hydrolysate of an acrylonitrile copolymer or an acrylamide copolymer, or a cross-linked product thereof, and a cross-linked polymer of a cationic monomer.

As the water-absorbent resin (D), the compounds listed above may be used alone or in combination of two or more kinds.

As described above, the content of the water-absorbent resin (D) may be adjusted in the range of 20 to 250 parts by mass when the resin component composed of the curable resin (A) and the polyether polyol (B) is set to 100 parts by mass. As the content of the water-absorbent resin (D) increases within this range, the amount of water absorbed is increased, and the swelling ratio is increased when the material absorbs water, but the swelling material strength decreases. In consideration of these, the content of the water-absorbent resin (D) may be 35 to 200 parts by mass, 50 to 150 parts by mass, and 60 to 100 parts by mass when the resin component composed of the curable resin (A) and the polyether polyol (B) is set to 100 parts by mass.

However, if the content of the water-absorbent resin (D) is less than 20 parts by mass when the resin component composed of the curable resin (A) and the polyether polyol (B) is set to 100 parts by mass, the swelling becomes insufficient even after water is absorbed. Therefore, a sufficient ability to stop water may not be obtained.

On the other hand, if the content of the water-absorbent resin (D) exceeds 250 parts by mass when the resin component composed of the curable resin (A) and the polyether polyol (B) is set to 100 parts by mass, the swelling ratio after absorbing water becomes high and the volume is increased, but the cross-linking density is decreased accordingly, and the swelling material strength is decreased. Therefore, a sufficient ability to stop water may not be obtained.

Examples of the water-absorbent resin (D) that is preferably used include, but are not limited to, Sunrose (registered trademark) F150LC manufactured by Nippon Paper Industries Co., Ltd., Aquacalk (registered trademark) TWB-P manufactured by Sumitomo Seika Chemicals Co., Ltd., and TG-SAP manufactured by Technica Goudou Co., Ltd.

When an ionic water-absorbent resin such as the above-mentioned carboxymethyl cellulose alkali metal salt or polyacrylic acid alkali metal salt is used as the water-absorbent resin (D), a polyvalent metal compound is known to be used in combination. With such a configuration, when a water stop steel sheet pile using the curable water-swelling water stop material comes into contact with water, the ionic water-absorbent resin and the polyvalent metal compound included in the curable water-swelling water stop material are dissolved in water. Then, the polyvalent metal ions generated by dissolving the polyvalent metal compound in water cross-link the ionized ionic water-absorbent resin, so that the ionic water-absorbent resin is restricted from free movement. As a result, water is taken into the ionic water-absorbent resin, and the ionic water-absorbent resin swells. On the other hand, the elastic effect of the curable resin (A) causes a force that retains the swollen ionic water-absorbent resin on the surface of the steel sheet pile, which balances with the swelling force to achieve the swelling equilibrium, so that water cannot move. As a result, the curable water-swelling water stop material stably maintains the swollen state for a long period of time, continuously closes the surrounding voids, and continuously exhibits a high ability to stop water for a long period of time.

The polyvalent metal compound is a divalent or higher water-soluble metal salt that produces divalent or higher metal ions when dissolved in water. The polyvalent metal ions generated by dissolving the polyvalent metal compound in water replace the ions contained in the ionic water-absorbent resin to cross-link the ionic water-absorbent resin. Therefore, the swelling material strength is improved. Further, since the polyvalent metal compound is included in the resin composition, the curable water-swelling water stop material is efficiently and surely in a swollen state. There is no problem even when the polyvalent metal compound is not included (even in 0 parts by mass), but these effects may be obtained if it is included.

Any type of polyvalent metal compound may be used without limitation as long as it is a divalent or higher water-soluble metal salt that produces divalent or higher metal ions when by dissolving. Examples of the polyvalent metal compound to be used include a calcium compound, an aluminum compound, a chromium compound, an iron compound, a zinc compound, and the like. Specific examples of the polyvalent metal compound to be used include calcium oxide, calcium hydroxide, aluminum sulfate, ferrous sulfate, chromium sulfate, potassium chromium sulfate, calcium sulfate, zinc sulfate, and the like. Among these, calcium oxide, calcium hydroxide, chromium sulfate, potassium chromium sulfate, aluminum sulfate, and the like are preferable. These polyvalent metal compounds are preferable in terms of dispersibility and availability. Examples of the polyvalent metal compound to be preferably used include, but are not limited to, Taiace S150 manufactured by Taimei Chemicals Co., Ltd.

The polyvalent metal compound can be optionally added as described above. The content of the polyvalent metal compound may be adjusted in the range of 0 to 18 parts by mass when the resin component composed of the curable resin (A) and the polyether polyol (B) is set to 100 parts by mass. As the content of the polyvalent metal compound increases within this range, the ionic water-absorbent resin swells more. The content of the polyvalent metal compound may be 3 to 15 parts by mass and may be 5 to 10 parts by mass when the resin component composed of the curable resin (A) and the polyether polyol (B) is set to 100 parts by mass. On the other hand, if the content of the polyvalent metal compound exceeds 18 parts by mass when the resin component composed of the curable resin (A) and the polyether polyol (B) is set to 100 parts by mass, the cross-linking of the ionic water-absorbent resin proceeds excessively, so that even when water is absorbed, the material may not swell sufficiently.

The extender pigment (E) is used to adjust the rheological properties of the curable water-swelling water stop material. There is no problem even when the extender pigment (E) is not included (even in 0 parts by mass), but if it is included, the viscosity of the curable water-swelling water stop material may be increased, and the material becomes clay-like. Therefore, if the extender pigment (E) is included, for example, even when the curable water-swelling water stop material is applied to the steel sheet pile which is vertically erected, the material is less likely to flow down. In consideration of these, the content of the extender pigment (E) may be arbitrarily adjusted as long as it is in the range of 0 to 160 parts by mass based on 100 parts by mass of the resin component composed of the curable resin (A) and the polyether polyol (B). The content of the extender pigment (E) may be adjusted depending on the desired physical properties of the curable water-swelling water stop material. For example, the content of the extender pigment (E) may be 100 parts by mass or less, 80 parts by mass or less, and 33.3 parts by mass or less based on 100 parts by mass of the resin component composed of the curable resin (A) and the polyether polyol (B). Note that the content of the extender pigment (E) may be 10 parts by mass or more, and 25 parts by mass or more based on 100 parts by mass of the resin component composed of the curable resin (A) and the polyether polyol (B).

On the other hand, when the content of the extender pigment (E) exceeds 160 parts by mass based on 100 parts by mass of the resin component composed of the curable resin (A) and the polyether polyol (B), the content of the extender pigment (E) is too large to obtain a sufficient cross-linking density, and the swelling material strength is decreased. Further, in this case, since the content of the extender pigment (E) is too large, the absorption of water is hindered and it may not be sufficiently swollen. Further, in this case, since the content of the extender pigment (E) is too large, the adhesion to metal is hindered or the adhesion points (adhesion density) become sparse, so that the adhesiveness is decreased.

Examples of the extender pigment (E) that may be used include bentonite, talc, calcium carbonate, silica, and the like. At least one of these may be used as the extender pigment (E).

Examples of the extender pigment (E) that may be preferably used include, but are not limited to, Bentonite 250SA-B manufactured by Sanritsu Kogyo Co., Ltd., Hi-Filler #12 manufactured by Matsumura Sangyo Co., Ltd., Calflex PM manufactured by New Lime Co., Ltd., HDK (registered trademark) H18 manufactured by Wacker Asahikasei Silicone Co., Ltd., and the like.

In addition, silica is preferably used because it has a large effect of modifying viscosity when a small amount of silica is added. Further, dry silica is preferable, and if the surface is treated with silicone or the like, the affinity with the resin is good and it is more preferably used.

The curable water-swelling water stop material according to the present embodiment preferably contains a dehydrating agent. There is no problem even when the dehydrating agent is not included (even in 0 parts by mass), but if it is included, it functions as a water scavenger, so that the preservation stability is improved. The content of the dehydrating agent may be arbitrarily adjusted as long as it is in the range of 0 to 15 parts by mass based on 100 parts by mass of the resin component composed of the curable resin (A) and the polyether polyol (B). The content of the dehydrating agent may be adjusted depending on the desired physical properties of the curable water-swelling water stop material. For example, the content of the dehydrating agent may be 0 to 10.0 parts by mass, 0 to 6.0 parts by mass, 0 to 4.0 parts by mass, and 0 to 3.0 parts by mass based on 100 parts by mass of the resin component composed of the curable resin (A) and the polyether polyol (B).

Examples of the dehydrating agent to be used include silane compounds such as vinyltrimethoxysilane, dimethyldimethoxysilane, tetraethoxysilane, methyltrimethoxysilane, methyltriethoxysilane, tetramethoxysilane, phenyltrimethoxysilane, and diphenyldimethoxysilane. Further, examples of the dehydrating agent to be used include ester compounds such as methyl orthoformate, ethyl orthoformate, methyl orthoacetate, and ethyl orthoacetate. These dehydrating agents may be used alone or in combination of two or more kinds.

Examples of the dehydrating agent to be used include, but are not limited to, GENIOSIL XL10 manufactured by Wacker Chemie AG. Note that when GENIOSIL XL10 is used as the dehydrating agent, the vinyl methoxysilane included therein reacts with water and hydrolyzes to form silanol. The silanol formed reacts with itself to produce a siloxane. In addition, the vinyl methoxysilane included in GENIOSIL XL10 functions as a comonomer. Therefore, these improve the strength and weather resistance of the curable water-swelling water stop material.

In The curable water-swelling water stop material according to the present embodiment described above, the condensation reaction proceeds without containing a volatile organic solvent in the composition. Therefore, in the curable water-swelling water stop material according to the present embodiment, the content of the volatile organic solvent may be set to zero or to a very small amount, which is favorable to workers and the environment.

Further, the curable water-swelling water stop material according to the present embodiment includes the above-mentioned composition, and thus is excellent in adhesiveness to metal, and sufficient in swelling ratio and a swelling material strength. Therefore, the curable water-swelling water stop material according to the present embodiment may obtain excellent water stoppability when used as a water stop material for a water stop steel sheet pile.

The curable water-swelling water stop material according to the present embodiment described above may be preferably used for a water stop steel sheet pile, but the present invention is not limited to this, and may be used for any member for the purpose of water-stopping or waterproofing. The curable water-swelling water stop material according to the present embodiment may also be used, for example, at a joining portion of a box culvert, a joining portion of a liner plate, and the like.

Water Stop Steel Sheet Pile

Figure 1:
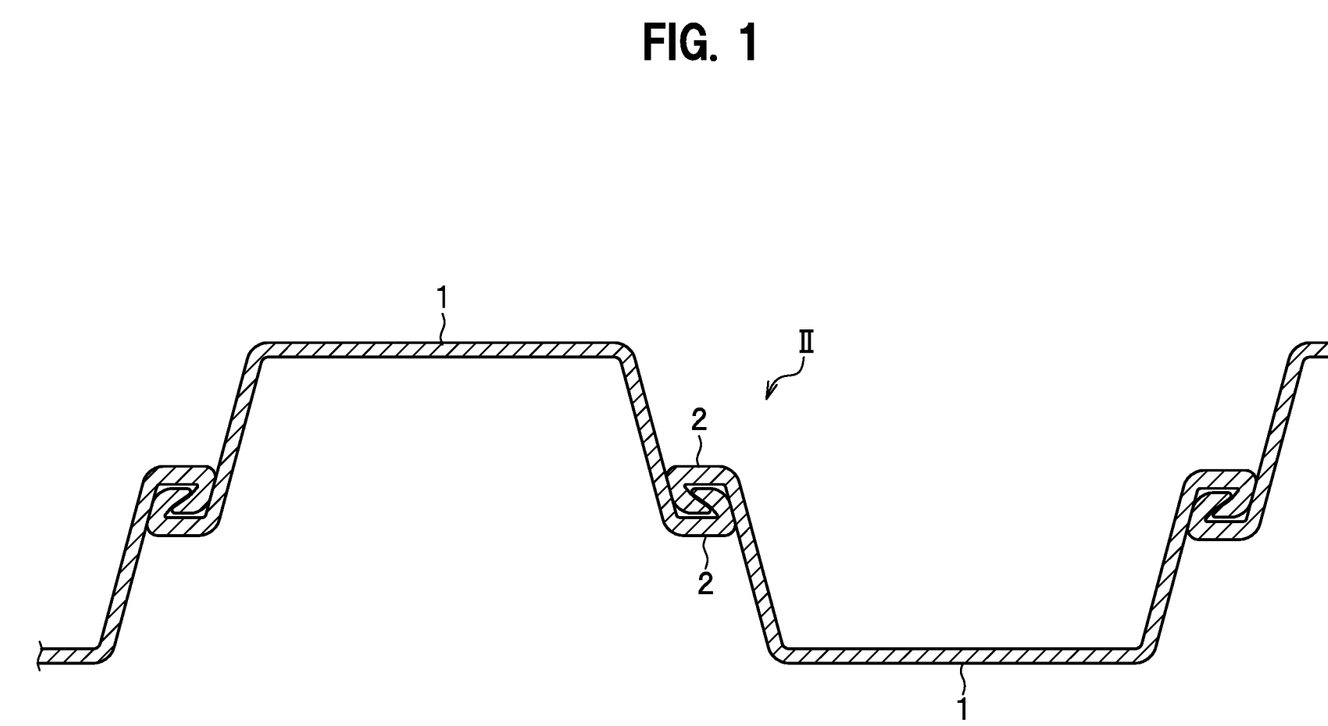
FIG. 1 is a cross-sectional view showing a state in which a plurality of water stop steel sheet piles according to the present embodiment are engaged.
Figure 2:
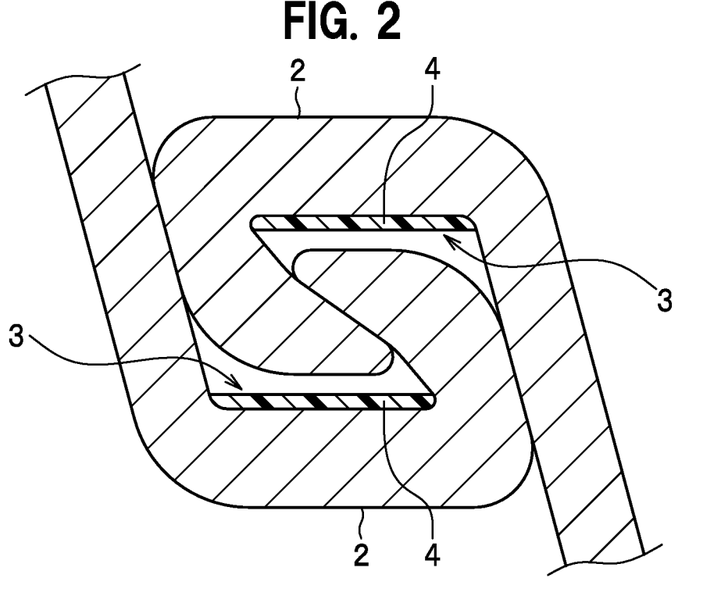
FIG. 2 is an enlarged view of portion II of FIG. 1.
Figure 3:
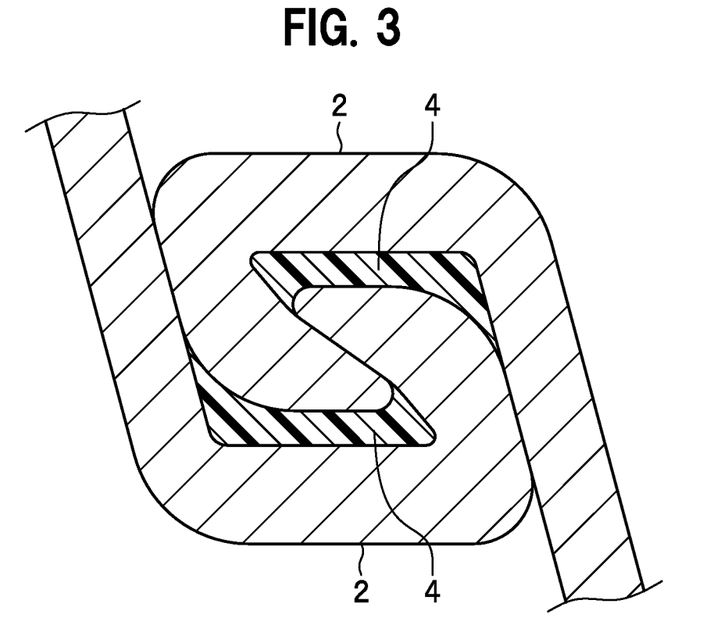
FIG. 3 is an explanatory view showing a state in which the curable water-swelling water stop material in the enlarged view of FIG. 2 has absorbed water and swollen.

FIG. 1 is a cross-sectional view showing a state in which water stop steel sheet piles 1 according to the present embodiment are engaged. FIG. 2 is an enlarged view of portion II of FIG. 1. FIG. 3 is an explanatory view showing a state in which the curable water-swelling water stop material in the enlarged view of FIG. 2 has absorbed water and swollen.

As the water stop steel sheet pile 1, any sheet pile may be used as long as it is a U-shaped steel sheet pile, a Z-shaped steel sheet pile, a hat-shaped steel sheet pile, a linear steel sheet pile, or the like, which are conventionally used in excavation work. Note that FIG. 1 illustrates water stop steel sheet piles 1 using U-shaped steel sheet piles. The water stop steel sheet pile 1 has joint portions 2 which are partially folded back at both ends in the width direction of the sheet pile. As shown in FIG. 1, the water stop steel sheet pile 1 is engaged with another adjacent water stop steel sheet pile 1 at their joint portions 2. At least parts of the water stop steel sheet piles are installed by driving it into the ground or the like.

As shown in FIG. 2, the water stop steel sheet pile 1 is provided with a coating film 4 of the curable water-swelling water stop material according to the present embodiment described above on the inner portion 3 formed by folding back the joint portion 2. After at least parts of the water stop steel sheet pile 1 is installed by driving it into the ground or the like, the coating film 4 absorbs groundwater or water from the sea or the river and swells as shown in FIG. 3 to fill the gap between the joint portions 2. In this way, the water stop steel sheet pile 1 stops the flow of water between the joint portion 2 and the joint portion 2.

Method of Producing a Water Stop Steel Sheet Pile

The water stop steel sheet pile 1 according to the present embodiment is preferably produced as follows.

Figure 4:
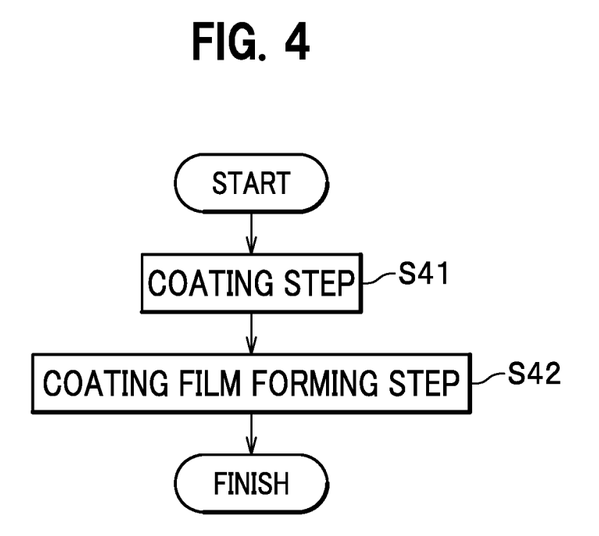
FIG. 4 is a flowchart explaining the process of a method of producing a water stop steel sheet pile according to the present embodiment.

FIG. 4 is a flowchart explaining the process of a method of producing a water stop steel sheet pile 1 according to the present embodiment (hereinafter referred to as the "present production method").

As shown in FIG. 4, the present production method includes a coating step S41 and a coating film forming step S42.

The coating step S41 is a step of coating the joint portion 2 of the water stop steel sheet pile 1 with the curable water-swelling water stop material according to the present embodiment described above.

Coating with The curable water-swelling water stop material is carried out, for example, after securing the end portion of the joint portion 2 with a curing tape or the like, by pouring the curable water-swelling water stop material into the joint portion 2 with an oil jug or the like. Also, a curable water-swelling water stop material may be adhered to the joint portion 2 with a brush, a spatula, or the like. An oil jug or brush is preferable when the curable water-swelling water stop material has a low viscosity and is in a liquid state, and a spatula is preferable when the curable water-swelling water stop material has a high viscosity and is clay-like. Further, the curable water-swelling water stop material may be applied, for example, by filling a sealant cartridge with the curable water-swelling water stop material and extruding it with an electric sealing gun.

The coating film forming step S42 is a step of curing the curable water-swelling water stop material applied in the coating step S41 to form the coating film 4 (see FIG. 2).

The curable water-swelling water stop material is cured under appropriate conditions depending on the composition. The curable water-swelling water stop material may be cured by, for example, leaving it for 1 to 24 hours after coating, but it may be appropriately changed depending on the season, temperature, and the like.

The present production method may include steps other than the coating step S41 and the coating film forming step S42. For example, the present production method may include a pretreatment step (not shown) of inspecting and removing foreign matter as well as cleaning the joint portion 2 before the coating step S41.

Water-Stopping Method

In the present embodiment, the following water-stopping method may be performed.

Figure 5:
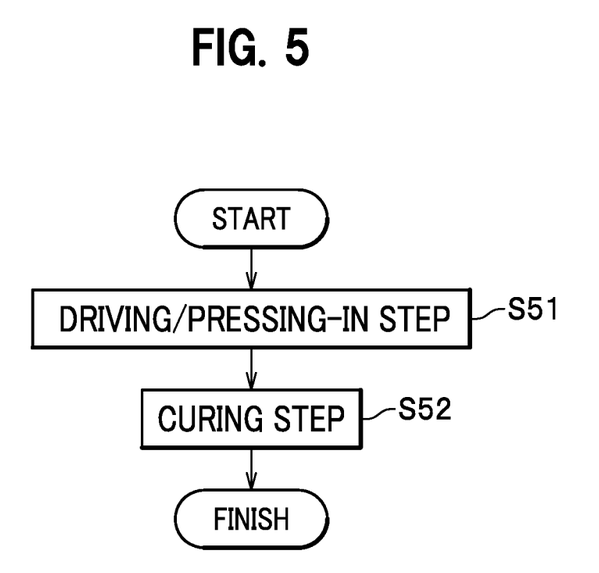
FIG. 5 is a flowchart explaining the process of the water-stopping method according to the present embodiment.
Figure 6:
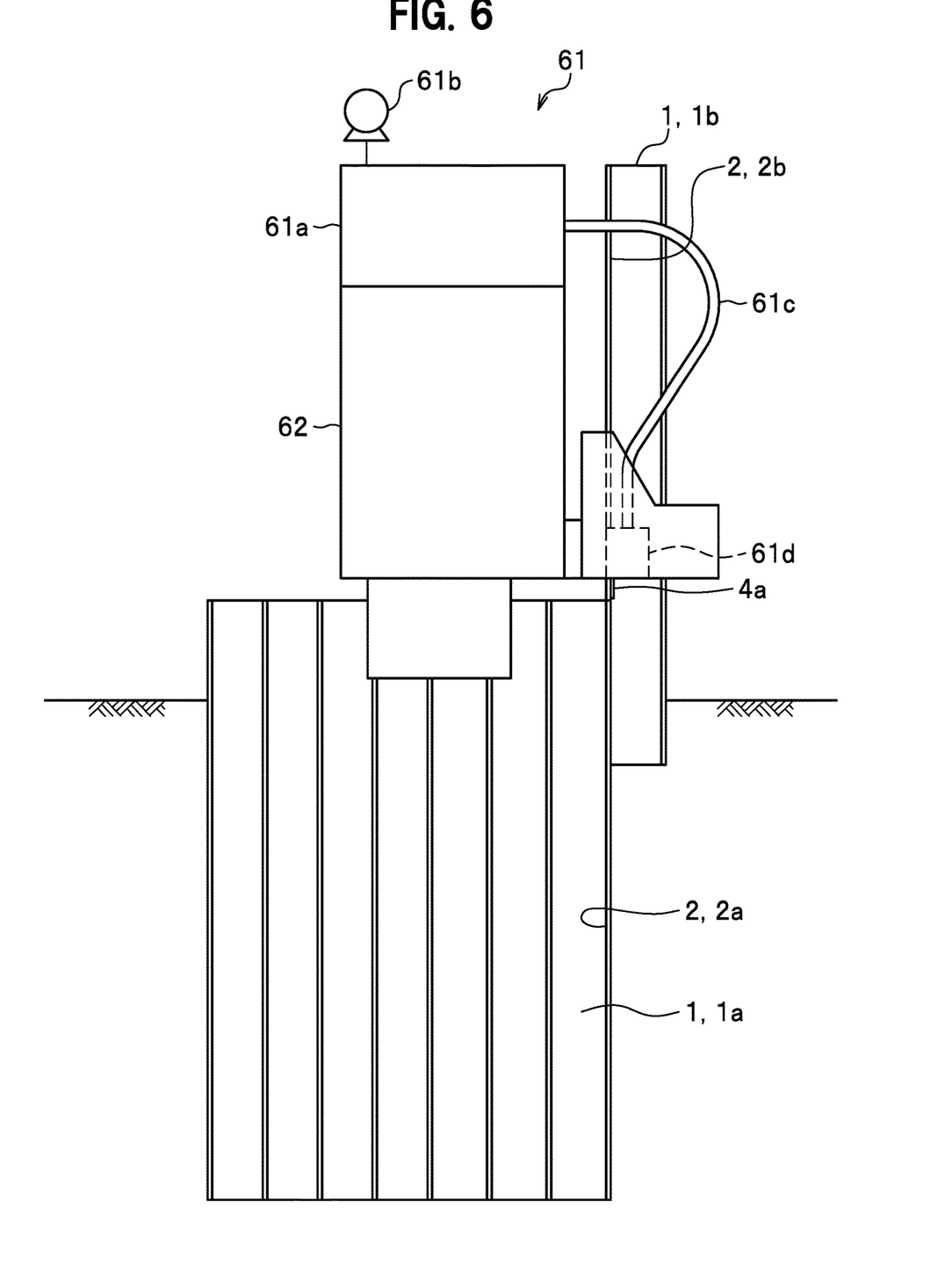
FIG. 6 is an explanatory view showing a state pressing steel sheet piles in the driving/pressing-in step.

FIG. 5 is a flowchart explaining the process of the water-stopping method according to the present embodiment. FIG. 6 is an explanatory view showing a state in which pressing-in is performed in a driving/pressing-in step S51.

As shown in FIG. 5, the water-stopping method according to the present embodiment includes a driving/pressing-in step S51 and a curing step S52.

The driving/pressing-in step S51 is a step of driving or pressing at least parts of water stop steel sheet piles 1 into the ground while the curable water-swelling water stop material according to the present embodiment described above is continuously being coated onto joint portions 2 of the water stop steel sheet piles 1. That is, in this driving/pressing-in step S51, the curable water-swelling water stop material 4a may remain liquid or clay-like (that is, the coating film 4 (see FIG. 2) does not has to have been formed).

The driving/pressing-in step S51 may be performed by using a pile driver or a press-in machine provided with a coating means 61 (see FIG. 6) capable of continuously coating the joint portion 2 with the curable water-swelling water stop material. Note that FIG. 6 shows a state in which at least parts of the water stop steel sheet piles 1 are pressed into the ground with the press-in machine 62. Examples of the pile driver include a vibro hammer. Examples of the press-in machine 62 include a hydraulic pile press-in and drawing machine.

The coating means 61 includes a tank 61a, a pressure applying device 61b, a tube 61c, and a coating tool 61d. The tank 61a is a container for storing the curable water-swelling water stop material. The pressure applying device 61b is a pump, a compressor, or the like that applies pressure to the curable water-swelling water stop material in the tank 61a. The tube 61c is a flexible hollow tube for transferring the curable water-swelling water stop material from the tank 61a. The coating tool 61d is a spray, a nozzle, a brush, or the like that coats the joint portion 2 of the water stop steel sheet pile 1 with the curable water-swelling water stop material transferred by the tube 61c. The coating tool 61d is preferably provided so that the curable water-swelling water stop material is supplied to the inner portion 3 (see FIG. 2) of the joint portion 2. Further, as the coating means 61, it is possible to use one in which a sealant cartridge is filled with the curable water-swelling water stop material and set in an electric sealing gun. The coating means 61 preferably adjusts the coating amount according to the press-in speed of the water stop steel sheet pile 1.

A specific example of applying the curable water-swelling water stop material in the driving/pressing-in step S51 is described with reference to FIG. 6. In the driving/pressing-in step S51, as shown in FIG. 6, a water stop steel sheet pile 1a with a joint portion 2a is previously provided and a water stop steel sheet pile 1b with a joint portion 2b which is currently provided is pressed into the ground such that the joint portion 2b of the water stop steel sheet pile 1b is engaged with the joint portion 2a of the water stop steel sheet pile 1a by using the press-in machine 62. The press-in machine 62 continuously supplies the curable water-swelling water stop material from the coating tool 61d to the inner portion 3 of the joint portion 2b of the water stop steel sheet pile 1b when the press-in is performed to the water stop steel pile 1b. The curable water-swelling water stop material used in this manner preferably has a viscosity in such a degree that it does not drip even when it is applied to the water stop steel sheet pile 1b vertically standing.

The curing step S52 is a step of curing the curable water-swelling water stop material to stop water after performing the driving/pressing-in step S51. In the water-stopping method according to the present embodiment, it is preferable to quickly cure the curable water-swelling water stop material, and therefore it is preferable to use a curable water-swelling water stop material having a short curing time. The curing time of the curable water-swelling water stop material may be shorten by increasing the content of the aminosilane coupling agent (C) or the content of the extender pigment (E), or by reducing the content of the polyether polyol (B) to zero or to a very small amount, for example.

The water stopping method according to the present embodiment may include steps other than the driving/pressing-in step S51 and the curing step S52. For example, the water stopping method according to the present embodiment may include a pretreatment step (not shown) of inspecting and removing foreign matter as well as cleaning the joint portion 2 before the driving/pressing-in step S51.

When work or the like using the water-stopping method according to the present embodiment is completed, the water stop steel sheet piles 1 are pulled out from the ground, and the curable water-swelling water stop material adhering to the joint portions 2 of the water stop steel sheet piles 1 is removed using a scraper, a water jet, or the like.

EXAMPLES

Hereinafter, the present invention is described in more detail with reference to Examples, but the present invention is not limited to these Examples. Note that Examples and comparative Examples are divided in Tables 1 to 5 due to space limitations, but the listed items are common.

Examples 1 to 24 and Comparative Examples 1 to 9

First, as shown in Tables 1 to 5, curable resin (A), polyether polyol (B), aminosilane coupling agent (C), water-absorbent resin (D), extender pigment (E), a urethane-based curable resin, an ethylene-vinyl acetate copolymer, a dehydrating agent, a polyvalent metal compound, and a curing accelerator were appropriately used to produce water-swelling water stop materials having the compositions shown in Examples 1 to 24 and Comparative Examples 1 to 9 in Tables 1 to 5. Note that as the curable resin (A), the polyether polyol (B), the aminosilane coupling agent (C), the water-absorbent resin (D), and the extender pigment (E), those already described in the embodiment were used. Their specific product names and the like are listed in Tables 1 to 5. Moreover, their manufacturers and the like are described in the embodiment.

For the water-swelling water stop materials according to Examples 1 to 24 and Comparative Examples 1 to 9 produced, the metal adhesiveness, swelling ratio, swelling material strength, viscosity, curing time, and coating film strength were measured. These measurements were performed as follows. Note that as for the metal adhesiveness, the adhesiveness between the cured coating film and the metal was measured. As for the swelling ratio, the swelling ratio after swelling with salt water (salt concentration 3%) was measured as a supposition that the material is used to stop water in the ocean. For the coating film strength, the tensile strength was measured. Among these measurement items, pass/fail judgments were made for metal adhesiveness, swelling ratio calculated by weight, and swelling material strength.

Metal Adhesiveness (Cured Coating Film)

The metal adhesiveness was measured by pulling the dolly adhered to the coating film surface with the precision universal testing machine Autograph AG-IS 50 kN (manufactured by Shimadzu Corporation).

For the metal adhesiveness, measured values of 3.0 kgf/cm$^2$ or more were regarded as passed, and measured values of less than 3.0 kgf/cm$^2$ were regarded as failed.

Swelling Ratio (Salt Water)

The swelling ratio was measured by immersing the samples in 3% saline solution at 20° C. for 48 hours and weighing the samples before and after immersing.

For the swelling ratio, measured values of 3.0 times or more were regarded as passed, and measured values of less than 3.0 times were regarded as failed.

Swelling Material Strength

For the swelling material strength, a penetrating tool having a diameter of 3 mm was attached to a small tabletop testing machine EZ-SX, and penetration elasticity values of the swelling coating film was measured.

For the swelling material strength, measured values of 3.0 N or more were regarded as passed, and measured values of less than 3.0 N were regarded as failed.

Viscosity

For the viscosity, samples held at 20° C. were measured with a type B viscometer.

Curing Time

For the curing time, the curing state was determined by the method of JIS K 5600-3-3.

Coating Film Strength (Tensile Strength)

The coating film strength (tensile strength) was measured by pulling a test piece prepared with a JIS K 6251 dumbbell No. 2 punching blade with a small tabletop tester EZ-SX and measuring the breaking strength.

Tables 1 to 5 show the compositions of the curable water-swelling water stop materials of Examples 1 to 24 and Comparative Examples 1 to 9 and the measurement results of metal adhesiveness (cured coating film), swelling ratio (salt water), swelling material strength, viscosity, curing time, and coating film strength (tensile strength). Regarding the compositions of Examples 1 to 24 and Comparative Examples 1 to 9 shown in Tables 1 to 5, the blanks indicate that no raw material is added. In addition, in Tables 1 to 5, in relation to the examination of the content (examination of the presence or absence of the content), those for which it is particularly desired to indicate that no raw material is added are described as "0.0". Further, Example 8 of Table 2 is described for facilitating comparison with other Examples and Comparative Examples in Table 2, which is the same as Example 2 of Table 1.

TABLE 1

| | | | Unit | Comparative Example 1 | Comparative Example 2 | Comparative Example 3 | Example 1 |
|---|---|---|---|---|---|---|---|
| Resin Component | (A) Curable Resin | GENIOSIL STP-E10 | Parts by mass | | | | |
| | | GENIOSIL STP-E30 | | | | 50.0 | 50.0 |
| | (B) Plasticizer (Diluent) | UNIOL D-700 (PPG) | | | | 50.0 | 50.0 |
| | | UNIOL TG-1000R | | | | | |
| | | Toluene | | | 80 | | |
| | | Urethane-Based Curable Resin | | 100 | | | |
| | | Ethylene-Vinyl Acetate Copolymer | | | 20 | | |
| | Subtotal of Resin Components (Set to 100 Parts by Mass) | | | 100 | 100 | 100.0 | 100.0 |
| (C) Aminosilane Coupling Agent | | GENIOSIL GF96 | | | | 0.0 | 0.3 |
| (D) Water-Absorbent Resin | | Sunrose F150LC | | | 40 | 95.0 | 95.0 |
| | | Aquacalk TWB-P | | | | | |
| | | Polyacrylic Acid TG-SAP | | | | | |
| (E) Extender Pigment | | Bentonite 250SA-B | | | | | |
| | | Hi-Filler #12 Talc | | | | | |
| | | Calflex PM (Calcium Carbonate) | | | | | |
| | | HDK H18 | | | | | |
| Dehydrating Agent | | GENIOSIL XL10 | | | | 5.5 | 5.5 |
| Polyvalent Metal Compound | | Taiace S150 (Aluminum Sulfate) | | | 2 | 4.8 | 4.8 |
| Curing Accelerator | | 1-Methylimidazole | | 0.2 | | | |
| Total of Curable Water-Swelling Water stop Material | | | | 100.2 | 142.0 | 205.3 | 205.5 |
| Metal Adhesiveness (Cured Coating Film) | | | kgf/cm² | 1.9 | 0.9 | 1.9 | 4.0 |
| Viscosity | | | cps | 5000 | 20000 | 5000 | 6000 |
| Curing Time | | | hr | 18 | 15 | 48 | 22 |
| Coating Film Strength (Tensile Strength) | | | kgf/cm² | 70 | 60 | 180 | 160 |
| Swelling Ratio (Salt Water) | | | Times | 3.9 | 4.2 | 6.0 | 6.1 |
| Swelling Material Strength | | | N | 7.0 | 3.2 | 5.0 | 5.2 |

| | | | Unit | Example 2 | Example 3 | Example 4 | Comparative Example 4 |
|---|---|---|---|---|---|---|---|
| Resin Component | (A) Curable Resin | GENIOSIL STP-E10 | Parts by mass | | | | |
| | | GENIOSIL STP-E30 | | 50.0 | 50.0 | 50.0 | 50.0 |
| | (B) Plasticizer (Diluent) | UNIOL D-700 (PPG) | | 50.0 | 50.0 | 50.0 | 50.0 |
| | | UNIOL TG-1000R | | | | | |
| | | Toluene | | | | | |
| | | Urethane-Based Curable Resin | | | | | |
| | | Ethylene-Vinyl Acetate Copolymer | | | | | |
| | Subtotal of Resin Components (Set to 100 Parts by Mass) | | | 100.0 | 100.0 | 100.0 | 100.0 |
| (C) Aminosilane Coupling Agent | | GENIOSIL GF96 | | 4.0 | 8.0 | 25.0 | 30.0 |
| (D) Water-Absorbent Resin | | Sunrose F150LC | | 95.0 | 95.0 | 95.0 | 95.0 |
| | | Aquacalk TWB-P | | | | | |
| | | Polyacrylic Acid TG-SAP | | | | | |

TABLE 1-continued

|  |  |  | | | | |
|---|---|---|---|---|---|---|
| (E) Extender Pigment | Bentonite 250SA-B | | | | | |
|  | Hi-Filler #12 Talc | | | | | |
|  | Calflex PM (Calcium Carbonate) | | | | | |
|  | HDK H18 | | | | | |
| Dehydrating Agent | GENIOSIL XL10 | | 5.5 | 5.5 | 5.5 | 5.5 |
| Polyvalent Metal Compound | Taiace S150 (Aluminum Sulfate) | | 4.8 | 4.8 | 4.8 | 4.8 |
| Curing Accelerator | 1-Methylimidazole | | | | | |
| Total of Curable Water-Swelling Water stop Material | | | 209.3 | 213.3 | 230.3 | 235.3 |
| Metal Adhesiveness (Cured Coating Film) | | kgf/cm² | 7.4 | 7.4 | 8.0 | 8.1 |
| Viscosity | | cps | 6500 | 8000 | 10000 | Unmeasurable |
| Curing Time | | hr | 7 | 3 | 1 | 0.1 |
| Coating Film Strength (Tensile Strength) | | kgf/cm² | 231 | 228 | 200 | 140 |
| Swelling Ratio (Salt Water) | | Times | 5.9 | 5.9 | 4.9 | 2.9 |
| Swelling Material Strength | | N | 5.5 | 5.5 | 6.0 | 6.5 |

TABLE 2

|  |  |  | Unit | Example 5 | Example 6 | Example 7 | Example 8 |
|---|---|---|---|---|---|---|---|
| Resin Component | (A) Curable Resin | GENIOSIL STP-E10 | Parts by mass | | | | |
|  |  | GENIOSIL STP-E30 | | 50.0 | 50.0 | 50.0 | 50.0 |
|  | (B) Plasticizer (Diluent) | UNIOL D-700 (PPG) | | 50.0 | 50.0 | 50.0 | 50.0 |
|  |  | UNIOL TG-1000R | | | | | |
|  |  | Toluene | | | | | |
|  |  | Urethane-Based Curable Resin | | | | | |
|  |  | Ethylene-Vinyl Acetate Copolymer | | | | | |
| Subtotal of Resin Components (Set to 100 Parts by Mass) | | | | 100.0 | 100.0 | 100.0 | 100.0 |
| (C) Aminosilane Coupling Agent | | GENIOSIL GF96 | | 4.0 | 4.0 | 4.0 | 4.0 |
| (D) Water-Absorbent Resin | | Sunrose F150LC | | 95.0 | 95.0 | 95.0 | 95.0 |
|  |  | Aquacalk TWB-P | | | | | |
|  |  | Polyacrylic Acid TG-SAP | | | | | |
| (E) Extender Pigment | | Bentonite 250SA-B | | | | | |
|  |  | Hi-Filler #12 Talc | | | | | |
|  |  | Calflex PM (Calcium Carbonate) | | | | | |
|  |  | HDK H18 | | | | | |
| Dehydrating Agent | | GENIOSIL XL10 | | 0.0 | 10.0 | 5.5 | 5.5 |
| Polyvalent Metal Compound | | Taiace S150 (Aluminum Sulfate) | | 4.8 | 4.8 | 0.0 | 4.8 |
| Curing Accelerator | | 1-Methylimidazole | | | | | |
| Total of Curable Water-Swelling Water stop Material | | | | 203.8 | 213.8 | 204.5 | 209.3 |
| Metal Adhesiveness (Cured Coating Film) | | | kgf/cm² | 7.3 | 7.2 | 7.0 | 7.4 |
| Viscosity | | | cps | 9000 | 6100 | 7000 | 6500 |
| Curing Time | | | hr | 2.0 | 10 | 7.5 | 7 |
| Coating Film Strength (Tensile Strength) | | | kgf/cm² | 220 | 231 | 225 | 231 |
| Swelling Ratio (Salt Water) | | | Times | 5.8 | 6.0 | 3.1 | 5.9 |
| Swelling Material Strength | | | N | 5.4 | 5.6 | 5.2 | 5.5 |

|  |  |  | Unit | Example 9 | Example 10 | Comparative Example 5 |
|---|---|---|---|---|---|---|
| Resin Component | (A) Curable Resin | GENIOSIL STP-E10 | Parts by mass | | | |
|  |  | GENIOSIL STP-E30 | | 50.0 | 50.0 | 50.0 |
|  | (B) Plasticizer (Diluent) | UNIOL D-700 (PPG) | | 50.0 | 50.0 | 50.0 |
|  |  | UNIOL TG-1000R | | | | |
|  |  | Toluene | | | | |
|  |  | Urethane-Based Curable Resin | | | | |
|  |  | Ethylene-Vinyl Acetate Copolymer | | | | |
| Subtotal of Resin Components (Set to 100 Parts by Mass) | | | | 100.0 | 100.0 | 100.0 |
| (C) Aminosilane Coupling Agent | | GENIOSIL GF96 | | 4.0 | 4.0 | 4.0 |
| (D) Water-Absorbent Resin | | Sunrose F150LC | | 95.0 | 95.0 | 95.0 |
|  |  | Aquacalk TWB-P | | | | |
|  |  | Polyacrylic Acid TG-SAP | | | | |
| (E) Extender Pigment | | Bentonite 250SA-B | | | | |
|  |  | Hi-Filler #12 Talc | | | | |
|  |  | Calflex PM (Calcium Carbonate) | | | | |
|  |  | HDK H18 | | | | |

TABLE 2-continued

|  |  |  |  |  |  |
|---|---|---|---|---|---|
| Dehydrating Agent | GENIOSIL XL10 |  | 5.5 | 5.5 | 5.5 |
| Polyvalent Metal Compound | Taiace S150 (Aluminum Sulfate) |  | 10.0 | 15.0 | 20.0 |
| Curing Accelerator | 1-Methylimidazole |  |  |  |  |
| Total of Curable Water-Swelling Water stop Material |  |  | 214.5 | 219.5 | 224.5 |
| Metal Adhesiveness (Cured Coating Film) |  | kgf/cm² | 7.3 | 7.2 | 7.5 |
| Viscosity |  | cps | 5800 | 6100 | Unmeasurable |
| Curing Time |  | hr | 8.0 | 10 | 10 |
| Coating Film Strength (Tensile Strength) |  | kgf/cm² | 220 | 231 | 200 |
| Swelling Ratio (Salt Water) |  | Times | 6.5 | 7.0 | 2.9 |
| Swelling Material Strength |  | N | 6.0 | 6.2 | 6.2 |

TABLE 3

|  |  |  | Unit | Example 11 | Example 12 | Example 13 | Example 14 | Comparative Example 6 |
|---|---|---|---|---|---|---|---|---|
| Resin Component | (A) Curable Resin | GENIOSIL STP-E10 | Parts by mass | 100 | 67.0 | 67.0 | 40.0 | 36.0 |
|  |  | GENIOSIL STP-E30 |  |  |  |  |  |  |
|  | (B) Plasticizer (Diluent) | UNIOL D-700 (PPG) |  |  | 33.0 |  | 60.0 | 64.0 |
|  |  | UNIOL TG-1000R |  |  |  | 33.0 |  |  |
|  |  | Toluene |  |  |  |  |  |  |
|  |  | Urethane-Based Curable Resin |  |  |  |  |  |  |
|  |  | Ethylene-Vinyl Acetate Copolymer |  |  |  |  |  |  |
| Subtotal of Resin Components (Set to 100 Parts by Mass) |  |  |  | 100.0 | 100.0 | 100.0 | 100.0 | 100.0 |
| (C) Aminosilane Coupling Agent | GENIOSIL GF96 |  |  | 2.0 | 2.0 | 2.0 | 2.0 | 2.0 |
| (D) Water-Absorbent Resin | Sunrose F150LC |  |  |  |  |  |  |  |
|  | Aquacalk TWB-P |  |  | 50.0 | 50.0 | 50.0 | 50.0 | 50.0 |
|  | Polyacrylic Acid TG-SAP |  |  |  |  |  |  |  |
| (E) Extender Pigment | Bentonite 250SA-B |  |  |  |  |  |  |  |
|  | Hi-Filler #12 Talc |  |  | 33.3 | 33.3 | 33.3 | 33.3 | 33.3 |
|  | Calflex PM (Calcium Carbonate) |  |  |  |  |  |  |  |
|  | HDK H18 |  |  |  |  |  |  |  |
| Dehydrating Agent | GENIOSIL XL10 |  |  | 3.3 | 3.3 | 3.3 | 3.3 | 3.3 |
| Polyvalent Metal Compound | Taiace S150 (Aluminum Sulfate) |  |  |  |  |  |  |  |
| Curing Accelerator | 1-Methylimidazole |  |  |  |  |  |  |  |
| Total of Curable Water-Swelling Water stop Material |  |  |  | 188.7 | 188.7 | 188.7 | 188.7 | 188.7 |
| Metal Adhesiveness (Cured Coating Film) |  |  | kgf/cm² | 8.0 | 7.4 | 6.8 | 4.5 | 2.3 |
| Viscosity |  |  | cps | 150000 | 8000 | 10000 | 3500 | 3000 |
| Curing Time |  |  | hr | 3 | 7 | 8 | 8 | 12 |
| Coating Film Strength (Tensile Strength) |  |  | kgf/cm² | 235 | 229 | 240 | 150 | 100 |
| Swelling Ratio (Salt Water) |  |  | Times | 4.2 | 4.4 | 4.2 | 4.2 | 2.8 |
| Swelling Material Strength |  |  | N | 8.0 | 7.5 | 7.7 | 7.7 | 3.0 |

TABLE 4

|  |  |  | Unit | Comparative Example 7 | Example 15 | Example 16 | Example 17 |
|---|---|---|---|---|---|---|---|
| Resin Component | (A) Curable Resin | GENIOSIL STP-E10 | Parts by mass | 67.0 | 67.0 | 67.0 | 67.0 |
|  |  | GENIOSIL STP-E30 |  |  |  |  |  |
|  | (B) Plasticizer (Diluent) | UNIOL D-700 (PPG) |  | 33.0 | 33.0 | 33.0 | 33.0 |
|  |  | UNIOL TG-1000R |  |  |  |  |  |
|  |  | Toluene |  |  |  |  |  |
|  |  | Urethane-Based Curable Resin |  |  |  |  |  |
|  |  | Ethylene-Vinyl Acetate Copolymer |  |  |  |  |  |
| Subtotal of Resin Components (Set to 100 Parts by Mass) |  |  |  | 100.0 | 100.0 | 100.0 | 100.0 |
| (C) Aminosilane Coupling Agent | GENIOSIL GF96 |  |  | 1.5 | 1.5 | 1.5 | 1.5 |
| (D) Water-Absorbent Resin | Sunrose F150LC |  |  |  |  |  |  |
|  | Aquacalk TWB-P |  |  | 12.5 | 20.0 | 37.5 | 100.0 |
|  | Polyacrylic Acid TG-SAP |  |  |  |  |  |  |
| (E) Extender Pigment | Bentonite 250SA-B |  |  |  |  |  |  |
|  | Hi-Filler #12 Talc |  |  | 25.0 | 25.0 | 25.0 | 25.0 |
|  | Calflex PM (Calcium Carbonate) |  |  |  |  |  |  |
|  | HDK H18 |  |  |  |  |  |  |

TABLE 4-continued

| | | | | | | |
|---|---|---|---|---|---|---|
| Dehydrating Agent | GENIOSIL XL10 | | 2.5 | 2.5 | 2.5 | 2.5 |
| Polyvalent Metal Compound | Taiace S150 (Aluminum Sulfate) | | | | | |
| Curing Accelerator | 1-Methylimidazole | | | | | |
| Total of Curable Water-Swelling Water stop Material | | | 141.5 | 149.0 | 166.5 | 229.0 |
| Metal Adhesiveness (Cured Coating Film) | | kgf/cm² | 9.0 | 8.2 | 7.6 | 6.9 |
| Viscosity | | cps | 3500 | 4000 | 5000 | 9000 |
| Curing Time | | hr | 14 | 15 | 14 | 13 |
| Coating Film Strength (Tensile Strength) | | kgf/cm² | 130 | 125 | 110 | 123 |
| Swelling Ratio (Salt Water) | | Times | 1.1 | 3.2 | 3.9 | 9.8 |
| Swelling Material Strength | | N | 10.0 | 8.0 | 7.9 | 7.0 |

| | | | Unit | Example 18 | Example 19 | Comparative Example 8 |
|---|---|---|---|---|---|---|
| Resin Component | (A) Curable Resin | GENIOSIL STP-E10 | Parts by mass | 67.0 | 67.0 | 67.0 |
| | | GENIOSIL STP-E30 | | | | |
| | (B) Plasticizer (Diluent) | UNIOL D-700 (PPG) | | 33.0 | 33.0 | 33.0 |
| | | UNIOL TG-1000R | | | | |
| | | Toluene | | | | |
| | | Urethane-Based Curable Resin | | | | |
| | | Ethylene-Vinyl Acetate Copolymer | | | | |
| Subtotal of Resin Components (Set to 100 Parts by Mass) | | | | 100.0 | 100.0 | 100.0 |
| (C) Aminosilane Coupling Agent | | GENIOSIL GF96 | | 1.5 | 1.5 | 1.5 |
| (D) Water-Absorbent Resin | | Sunrose F150LC | | | | |
| | | Aquacalk TWB-P | | | 250.0 | 275.0 |
| | | Polyacrylic Acid TG-SAP | | 100.0 | | |
| (E) Extender Pigment | | Bentonite 250SA-B | | | | |
| | | Hi-Filler #12 Talc | | 25.0 | 25.0 | 25.0 |
| | | Calflex PM (Calcium Carbonate) | | | | |
| | | HDK H18 | | | | |
| Dehydrating Agent | | GENIOSIL XL10 | | 2.5 | 2.5 | 2.5 |
| Polyvalent Metal Compound | | Taiace S150 (Aluminum Sulfate) | | | | |
| Curing Accelerator | | 1-Methylimidazole | | | | |
| Total of Curable Water-Swelling Water stop Material | | | | 229.0 | 379.0 | 404.0 |
| Metal Adhesiveness (Cured Coating Film) | | | kgf/cm² | 6.5 | 4.5 | 2.9 |
| Viscosity | | | cps | 10000 | 15000 | 20000 |
| Curing Time | | | hr | 14 | 17 | 18 |
| Coating Film Strength (Tensile Strength) | | | kgf/cm² | 115 | 123 | 95 |
| Swelling Ratio (Salt Water) | | | Times | 10.0 | 13.0 | 14.0 |
| Swelling Material Strength | | | N | 6.9 | 7.0 | 0.8 |

TABLE 5

| | | | Unit | Example 20 | Example 21 | Example 22 | Example 23 |
|---|---|---|---|---|---|---|---|
| Resin Component | (A) Curable Resin | GENIOSIL STP-E10 | Parts by mass | 60.0 | 60.0 | 60.0 | 60.0 |
| | | GENIOSIL STP-E30 | | | | | |
| | (B) Plasticizer (Diluent) | UNIOL D-700 (PPG) | | 40.0 | 40.0 | 40.0 | 40.0 |
| | | UNIOL TG-1000R | | | | | |
| | | Toluene | | | | | |
| | | Urethane-Based Curable Resin | | | | | |
| | | Ethylene-Vinyl Acetate Copolymer | | | | | |
| Subtotal of Resin Components (Set to 100 Parts by Mass) | | | | 100.0 | 100.0 | 100.0 | 100.0 |
| (C) Aminosilane Coupling Agent | | GENIOSIL GF96 | | 4.0 | 4.0 | 4.0 | 4.0 |
| (D) Water-Absorbent Resin | | Sunrose F150LC | | | | | |
| | | Aquacalk TWB-P | | 68.0 | 68.0 | 68.0 | 68.0 |
| | | Polyacrylic Acid TG-SAP | | | | | |
| (E) Extender Pigment | | Bentonite 250SA-B | | | | 80.0 | |
| | | Hi-Filler #12 Talc | | 80.0 | | | 160.0 |
| | | Calflex PM (Calcium Carbonate) | | | 80.0 | | |
| | | HDK H18 | | | | | |
| Dehydrating Agent | | GENIOSIL XL10 | | 4.0 | 4.0 | 4.0 | 4.0 |
| Polyvalent Metal Compound | | Taiace S150 (Aluminum Sulfate) | | | | | |
| Curing Accelerator | | 1-Methylimidazole | | | | | |
| Total of Curable Water-Swelling Water stop Material | | | | 256.0 | 256.0 | 256.0 | 336.0 |
| Metal Adhesiveness (Cured Coating Film) | | | kgf/cm² | 6.1 | 5.9 | 6.0 | 8.0 |

TABLE 5-continued

| | | | | | | | |
|---|---|---|---|---|---|---|---|
| Viscosity | | | cps | 90000 | 87000 | 84000 | 100000 |
| Curing Time | | | hr | 2 | 2 | 1 | 1 |
| Coating Film Strength (Tensile Strength) | | | kgf/cm$^2$ | 190 | 180 | 175 | 150 |
| Swelling Ratio (Salt Water) | | | Times | 4.8 | 4.5 | 4.9 | 4.5 |
| Swelling Material Strength | | | N | 5.3 | 4.9 | 4.6 | 4.8 |

| | | | Unit | Comparative Example 9 | Example 24 |
|---|---|---|---|---|---|
| Resin Component | (A) Curable Resin | GENIOSIL STP-E10 | Parts by mass | 60.0 | 67.0 |
| | | GENIOSIL STP-E30 | | | |
| | (B) Plasticizer (Diluent) | UNIOL D-700 (PPG) | | 40.0 | 33.0 |
| | | UNIOL TG-1000R | | | |
| | | Toluene | | | |
| | | Urethane-Based Curable Resin | | | |
| | | Ethylene-Vinyl Acetate Copolymer | | | |
| Subtotal of Resin Components (Set to 100 Parts by Mass) | | | | 100.0 | 100.0 |
| (C) Aminosilane Coupling Agent | | GENIOSIL GF96 | | 4.0 | 1.5 |
| (D) Water-Absorbent Resin | | Sunrose F150LC | | | |
| | | Aquacalk TWB-P | | 68.0 | |
| | | Polyacrylic Acid TG-SAP | | | 20.0 |
| (E) Extender Pigment | | Bentonite 250SA-B | | | |
| | | Hi-Filler #12 Talc | | 180.0 | |
| | | Calflex PM (Calcium Carbonate) | | | |
| | | HDK H18 | | | 10.0 |
| Dehydrating Agent | | GENIOSIL XL10 | | 4.0 | 2.5 |
| Polyvalent Metal Compound | | Taiace S150 (Aluminum Sulfate) | | | |
| Curing Accelerator | | 1-Methylimidazole | | | |
| Total of Curable Water-Swelling Water stop Material | | | | 356.0 | 134.0 |
| Metal Adhesiveness (Cured Coating Film) | | | kgf/cm$^2$ | 2.8 | 8.5 |
| Viscosity | | | cps | 120000 | 100000 |
| Curing Time | | | hr | 1 | 15 |
| Coating Film Strength (Tensile Strength) | | | kgf/cm$^2$ | 98 | 130 |
| Swelling Ratio (Salt Water) | | | Times | 2.9 | 4.0 |
| Swelling Material Strength | | | N | 2.0 | 8.5 |

Since the curable water-swelling water stop materials shown in Examples 1 to 24 do not contain a volatile organic solvent in the composition, it is favorable to workers and the environment. Further, as shown in Tables 1 to 5, the curable water-swelling water stop materials shown in Examples 1 to 24 satisfied the requirements of the present invention, and thus were excellent in metal adhesiveness, swelling ratio, and swelling material strength.

Since the curable water-swelling water stop materials shown in Comparative Examples 1 and 3 to 9 did not contain a volatile organic solvent in the composition, they were favorable to workers and the environment. However, as shown in Tables 1 to 5, since the curable water-swelling water stop materials shown in Comparative Examples 1 to 9 did not satisfy the requirements of the present invention, at least one of metal adhesiveness, swelling ratio, and swelling material strength was inferior.

Specifically, the curable water-swelling water stop material shown in Comparative Example 1 was a urethane-based conventional curable water-swelling water stop material, and therefore had inferior in metal adhesiveness.

The curable water-swelling water stop material shown in Comparative Example 2 is a conventional curable water-swelling water stop material containing a volatile organic solvent (toluene) in the composition. Since the curable water-swelling water stop material shown in Comparative Example 2 contained a volatile organic solvent in the composition, it was not favorable to workers or the environment. Further, the curable water-swelling water stop material shown in Comparative Example 2 was inferior in metal adhesiveness.

The curable water-swelling water stop material shown in Comparative Example 3 was inferior in metal adhesiveness because the content of the aminosilane coupling agent (C) was less than the lower limit.

The curable water-swelling water stop material shown in Comparative Example 4 was inferior in swelling ratio because the content of the aminosilane coupling agent (C) exceeded the upper limit.

The curable water-swelling water stop material shown in Comparative Example 5 was inferior in swelling ratio because the content of the polyvalent metal compound was too large.

The curable water-swelling water stop material shown in Comparative Example 6 was inferior in metal adhesiveness and weight swelling ratio because the content of the polyether polyol (B) exceeded the upper limit (that is, the amount of the curable resin (A) added was less than the lower limit).

The curable water-swelling water stop material shown in Comparative Example 7 was inferior in weight swelling ratio because the content of the water-absorbent resin (D) was less than the lower limit.

The curable water-swelling water stop material shown in Comparative Example 8 was inferior in metal adhesiveness and swelling material strength because the content of the water-absorbent resin (D) exceeded the upper limit.

The curable water-swelling water stop material shown in Comparative Example 9 was inferior in metal adhesiveness, swelling ratio, and swelling material strength because the content of the extender pigment (E) exceeded the upper limit.

Example 25

A U-shaped steel sheet pile type SP-2 (length 10 m) specified in JIS A 5523 was placed horizontally. Next, the curable water-swelling water stop material shown in Example 17 was put into an oil jug and poured into both joint portions (tab portions) such that a total coating amount was 0.2 kg/m (was poured into each joint portion such that the coating amount was 0.1 kg/m). Then, it was left to stand for 24 hours and was sufficiently cured to form a coating film.

Twenty-eight water stop steel sheet piles produced in this manner were driven into a lake at a depth of 4 m in a rectangular shape of 5 sheets×9 sheets with a vibro hammer so as to have an embedding length of 5 m. In this state, the water stop material was sufficiently swollen (expanded) by leaving it for one day (24 hours), and the cofferdam portion was drained by a pump.

After draining, the water stopping state was visually checked, and it was found that the water stop material was not peeled off and swelled sufficiently, there was no water leakage, and thus the ability to stop the water was good.

Example 26

The curable water-swelling water stop material shown in Example 20 was filled into a sealant cartridge and set in an electric sealing gun. Sheet piles of U-shaped steel sheet pile type SP-2 (length 10 m) specified in JIS A 5523 were set on a vibro hammer at a revetment work sight of a river.

Then, while 28 pieces of these steel sheet piles were being driven, the curable water-swelling water stop material set in the electric sealing gun was extruded and applied to the inside of one of the joint portions (that is, inside the joint portion of the steel sheet pile that is being pressed with engaging with the joint portion of a different steel sheet pile) at the same speed as the press-in speed so that the coating amount was 0.1 kg/m. The 28 steel sheet piles were driven in a rectangular shape of 5 sheets×9 sheets.

After leaving it for one day (24 hours), the inside was excavated to a depth of 5 m and the state of water stopping of the groundwater was visually checked, and it was found that the water stop material was not peeled off and swelled sufficiently, there was no water leakage, and thus the ability to stop the water was good.

As described above, a curable water-swelling water stop material, a water stop steel sheet pile, a method of producing a water stop steel sheet pile, and a water-stopping method according to the present invention have been described in detail with reference to embodiments and examples, but the gist of the present invention is not limited to these, and includes various modifications.

REFERENCE SIGNS LIST 1, 1a, 1b water stop steel sheet pile
2, 2a, 2b joint portion
3 inner portion
4 coating film
61 coating means
62 press-in machine
S41 coating step
S42 coating film forming step
S51 driving/pressing-in step
S52 curing step

What is claimed is:

1. A curable water-swelling water stop material comprising:
   100 parts by mass of a resin component which includes
      40 to 100 parts by mass of a curable resin (A) having a hydrolysable alkoxysilyl group and
      0 to 60 parts by mass of a polyether polyol(B);
   0.3 to 25 parts by mass of an aminosilane coupling agent (C);
   20 to 250 parts by mass of a water-absorbent resin (D); and
   0 to 160 parts by mass of an extender pigment (E),
   wherein the hydrolysable alkoxysilyl group is represented by Formula (1)

$$-X-CH_2-SiR^1{}_Y(OR^2)_{3-Y} \quad \text{Formula (1)}$$

wherein X is a bonding functional group having a heteroatom with an unshared electron pair and bonding to a methylene group bonding to a silicon atom of a hydrolysable silicon group, $R^1$ and $R^2$ are $C_1$-$C_3$ alkyl groups respectively, and Y is 0, 1 or 2, and
   the aminosilane coupling agent (C) is 3-aminopropyltrimethoxysilane.

2. The curable water-swelling water stop material according to claim 1 wherein the water-absorbent resin (D) is at least one selected from the group consisting of a polyethylene oxide resin, a carboxymethyl cellulose alkali metal salt and a polyacrylic acid alkali metal salt.

3. The curable water-swelling water stop material according to claim 1 wherein the extender pigment (E) is at least one selected from the group consisting of bentonite, talc, calcium carbonatem and silica.

4. A water stop steel sheet pile comprising
   a coating film located on a joint portion of a steel sheet pile,
   wherein the coating film includes the curable water-swelling water stop material according to claim 1.

5. A method of manufacturing a water-swelling steel sheet pile comprising:
   a coating step of coating the curable water-swelling water stop material according to claim 1 onto a joint portion of a steel sheet pile; and
   a coating film forming step of curing the curable water-swelling water stop material to form a coating film.

6. A method of stopping water comprising:
   a driving/pressing-in step of driving or pressing at least a part of a water stop steel sheet pile into a ground while the curable water-swelling water stop material according to claim 1 is continuously coated onto a joint portion of the steel sheet pile; and
   a curing step of curing the curable water-swelling water stop material to stop water.

7. The curable water-swelling water stop material according to claim 2 wherein the extender pigment (E) is at leat one selected from the group consisting of bentonite, talc, calcium carbonate, and silica.

8. A water stop steel sheet pile comprising
   a coating film located on a joint portion of a steel sheet pile,
   wherein the coating film includes the curable water-swelling water stop material according to claim 2.

9. A water stop steel sheet pile comprising
   a coating film located on a joint portion of a steel sheet pile,
   wherein the coating film includes the curable water-swelling water stop material according to claim 3.

10. A water stop steel sheet pile comprising
a coating film located on a joint portion of a steel sheet pile,
wherein the coating film includes the curable water-swelling water stop material according to claim 7.

11. A method of manufacturing a water-swelling steel sheet pile comprising:
a coating step of coating the curable water-swelling water stop material according to claim 2 onto a joint portion of a steel sheet pile; and
a coating film forming step of curing the curable water-swelling water stop material to form a coating film.

12. A method of manufacturing a water-swelling steel sheet pile comprising:
a coating step of coating the curable water-swelling water stop material according to claim 3 onto a joint portion of a steel sheet pile; and
a coating film forming step of curing the curable water-swelling water stop material to form a coating film.

13. A method of manufacturing a water-swelling steel sheet pile comprising:
a coating step of coating the curable water-swelling water stop material according to claim 7 onto a joint portion of a steel sheet pile; and
a coating film forming step of curing the curable water-swelling water stop material to form a coating film.

14. A method of stopping water comprising:
a driving/pressing-in step of driving or pressing at least a part of a water stop steel sheet pile into a ground while the curable water-swelling water stop material according to claim 2 is continuously coated onto a joint portion of the steel sheet pile; and
a curing step of curing the curable water-swelling water stop material to stop water.

15. A method of stopping water comprising:
a driving/pressing-in step of driving or pressing at least a part of a water stop steel sheet pile into a ground while the curable water-swelling water stop material according to claim 3 is continuously coated onto a joint portion of the steel sheet pile; and
a curing step of curing the curable water-swelling water stop material to stop water.

16. A method of stopping water comprising:
a driving/pressing-in step of driving or pressing at least a part of a water stop steel sheet pile into a ground while the curable water-swelling water stop material according to claim 7 is continuously coated onto a joint portion of the steel sheet pile; and
a curing step of curing the curable water-swelling water stop material to stop water.

* * * * *